United States Patent
Koga et al.

(10) Patent No.: US 10,886,804 B2
(45) Date of Patent: Jan. 5, 2021

(54) ROTATING ELECTRICAL MACHINE

(71) Applicant: AISIN AW CO., LTD., Anjo (JP)

(72) Inventors: Kiyotaka Koga, Nishio (JP); Shingo Hashimoto, Okazaki (JP); Shingo Sato, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 701 days.

(21) Appl. No.: 15/561,188

(22) PCT Filed: Apr. 15, 2016

(86) PCT No.: PCT/JP2016/062127
§ 371 (c)(1),
(2) Date: Sep. 25, 2017

(87) PCT Pub. No.: WO2016/167353
PCT Pub. Date: Oct. 20, 2016

(65) Prior Publication Data
US 2018/0069445 A1    Mar. 8, 2018

(30) Foreign Application Priority Data

Apr. 16, 2015 (JP) .................................. 2015-084276
Aug. 24, 2015 (JP) .................................. 2015-164441

(51) Int. Cl.
*H02K 3/12* (2006.01)
*H02K 15/06* (2006.01)
(Continued)

(52) U.S. Cl.
CPC ............. *H02K 3/12* (2013.01); *H02K 1/2753* (2013.01); *H02K 1/32* (2013.01); *H02K 3/28* (2013.01);
(Continued)

(58) Field of Classification Search
CPC .. H02K 3/12; H02K 3/28; H02K 3/48; H02K 1/2753; H02K 1/32
See application file for complete search history.

(56) References Cited

U.S. PATENT DOCUMENTS 3,618,337 A    11/1971  Mount
2011/0260572 A1  10/2011  Hiraga et al.
(Continued)

FOREIGN PATENT DOCUMENTS

DE    10 2008 020 426 A1    10/2009
JP       2003-143791 A        3/2003
(Continued)

OTHER PUBLICATIONS

English translation JP2009189078A (Year: 2009).*
(Continued)

*Primary Examiner* — Nguyen Tran
(74) *Attorney, Agent, or Firm* — Oliff PLC

(57) ABSTRACT

A rotating electrical machine that includes a rotor core; a stator core disposed so as to face the rotor core in a radial direction and including a plurality of teeth and a plurality of slots each located between adjacent ones of the teeth; and a concentric coil formed by concentrically winding a wire, and including a slot accommodated portion placed in the slot of the stator core and a coil end portion projecting in an axial direction from the stator core, wherein of the slot accommodated portion of the concentric coil, an axial end of the slot accommodated portion located on a side facing the rotor core is located closer to an outside in the radial direction than an axial middle part of the slot accommodated portion located on the side facing the rotor core.

21 Claims, 8 Drawing Sheets

(51) Int. Cl.
*H02K 15/12* (2006.01)
*H02K 3/48* (2006.01)
*H02K 15/00* (2006.01)
*H02K 1/27* (2006.01)
*H02K 1/32* (2006.01)
*H02K 3/28* (2006.01)
*H02K 9/19* (2006.01)

(52) U.S. Cl.
CPC ............... *H02K 3/48* (2013.01); *H02K 9/19* (2013.01); *H02K 15/0031* (2013.01); *H02K 15/066* (2013.01); *H02K 15/12* (2013.01)

(56) References Cited

U.S. PATENT DOCUMENTS

| | | | |
|---|---|---|---|
| 2011/0291423 A1 | 12/2011 | Germishuizen et al. | |
| 2012/0274172 A1* | 11/2012 | Koga | H02K 3/12 310/208 |
| 2012/0293024 A1* | 11/2012 | Yokogawa | H02K 1/278 310/43 |
| 2013/0069456 A1 | 3/2013 | Matsuki et al. | |
| 2013/0151057 A1 | 6/2013 | Matsubara et al. | |
| 2014/0292119 A1 | 10/2014 | Takahashi | |

FOREIGN PATENT DOCUMENTS

| | | |
|---|---|---|
| JP | 2009-189078 A | 8/2009 |
| JP | 2011-120356 A | 6/2011 |
| JP | 2012-5289 A | 1/2012 |
| JP | 2012-023818 A | 2/2012 |
| JP | 2012-090511 A | 5/2012 |
| JP | 2013-132151 A | 7/2013 |
| JP | 2014-183647 A | 9/2014 |
| JP | 2015/61491 A | 3/2015 |
| WO | 2014/020755 A1 | 2/2014 |

OTHER PUBLICATIONS

Jul. 5, 2016 International Search Report issued in International Patent Application No. PCT/JP2016/062127.
U.S. Appl. No. 15/561,176, filed Sep. 25, 2017 in the name of Koga et al.
Jul. 5, 2016 International Search Report issued in International Patent Application No. PCT/JP2016/062135.
Mar. 2, 2018 Supplementary European Search Report issued in European Patent Application No. 16780144.8.
Mar. 2, 2018 Supplementary European Search Report issued in European Patent Application No. 16780147.1.
Mar. 5, 2020 Office Action issued in U.S. Appl. No. 15/561,176.
Machine Translation, Takebe, JP-2011120356-A, Jun. 2011. (Year: 2011).
Machine Translation, Nigo, JP-2012023818-A, Feb. 2012. (Year: 2012).

* cited by examiner

ROTATING ELECTRICAL MACHINE

BACKGROUND

The present disclosure relates to rotating electrical machines.

Conventionally, rotating electrical machines are known which eject a cooling medium to coils placed in a stator core to cool the coils. An example of such rotating electrical machines is disclosed in Japanese Patent Application Publication No. 2013-132151 (JP 2013-132151 A).

JP 2013-132151 A discloses a cooling structure (what is called a shaft core cooling structure) that ejects a cooling medium to coils by blowing cooling oil supplied to an oil passage formed in a rotor by a centrifugal force caused by rotation of the rotor. The cooling medium is ejected to coil end portions of coils which extend outward in the axial direction from slots of a stator core.

SUMMARY

When a cooling medium is ejected to coil end portions as in the cooling structure described in JP 2013-132151 A, a part of the cooling medium flows inward in the axial direction along the coil end portions and enters an airgap between a stator core and a rotor core. The cooling medium having entered the airgap increases drag torque that is generated when a rotor is rotated, which increases mechanical loss associated with the rotation. It is therefore desired to reduce entry of the cooling medium into the airgap.

An exemplary aspect of the present disclosure provides a rotating electrical machine that can reduce entry of a cooling medium into an airgap.

In order to achieve the above object, a rotating electrical machine according to a first aspect of the present disclosure includes: a rotor core; a stator core disposed so as to face the rotor core in a radial direction and including a plurality of teeth and a plurality of slots each located between adjacent ones of the teeth; and a concentric coil formed by concentrically winding a wire, and including a slot accommodated portion placed in the slot of the stator core and a coil end portion projecting in an axial direction from the stator core. Of the slot accommodated portion of the concentric coil, an axial end of the slot accommodated portion located on a side facing the rotor core is located closer to outside in the radial direction than an axial middle part of the slot accommodated portion located on the side facing the rotor core.

In the rotating electrical machine according to the first aspect of the present disclosure, as described above, of the slot accommodated portion of the concentric coil, the axial end of the slot accommodated portion located on the side facing the rotor core is located closer to the outside in the radial direction than the axial middle part of the slot accommodated portion located on the side facing the rotor core. If the slot accommodated portion has a linear shape, a cooling medium easily flows into the slot along the slot accommodated portion. However, the configuration of the first aspect can make it less likely for the cooling medium to flow into (toward an axial middle part of) the slot (make it easier for the cooling medium to flow toward the axial end) by a centrifugal force of the rotor core. This can reduce the amount of cooling medium that flows into the slot along the slot accommodated portion when the cooling medium is discharged onto the concentric coil. Entry of the cooling medium into an airgap between the stator core and the rotor core can thus be reduced.

A rotating electrical machine according to a second aspect of the present disclosure includes: a rotor core; a stator core disposed so as to face the rotor core in a radial direction and including a plurality of teeth and a plurality of slots each located between adjacent ones of the teeth; and a concentric coil formed by concentrically winding a wire, and including a slot accommodated portion placed in the slot of the stator core and a coil end portion projecting in an axial direction from the stator core. Of the slot accommodated portion of the concentric coil, an axial outer end of the coil end portion located on a side facing the rotor core is located closer to the outside in the radial direction than the axial end of the slot accommodated portion located on the side facing the rotor core.

In the rotating electrical machine according to the second aspect of the present disclosure, as described above, of the slot accommodated portion of the concentric coil, the axial outer end of the coil end portion located on the side facing the rotor core is located closer to the outside in the radial direction than the axial end of the slot accommodated portion located on the side facing the rotor core. A cooling medium that has cooled the coil end portion is thus more easily discharged toward the axial outer end of the coil end portion which is located closer to the outside in the radial direction. This can reduce the amount of cooling medium that flows into the slot along the slot accommodated portion and can thus reduce entry of the cooling medium into the airgap between the stator core and the rotor core.

According to the present disclosure, as described above, entry of the cooling medium into the airgap can be reduced.

DETAILED DESCRIPTION OF EMBODIMENTS

Embodiments of the present disclosure will be described with reference to the accompanying drawings.

First Embodiment (Structure of Rotating Electrical Machine)

The structure of a rotating electrical machine 100 according to a first embodiment will be described with reference to FIGS. 1 to 9.

Figure 1:
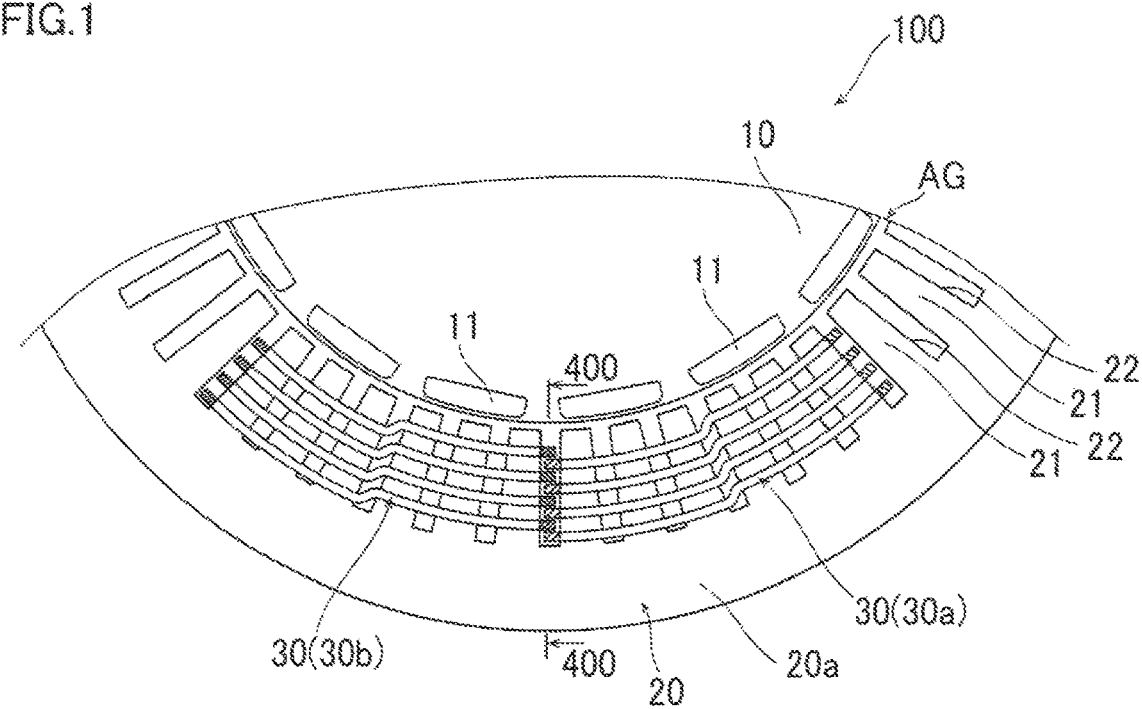
FIG. 1 is a plan view of a rotating electrical machine according to a first embodiment of the present disclosure.

As shown in FIG. 1, the rotating electrical machine 100 includes a rotor core 10. The rotor core 10 is provided with a plurality of permanent magnets 11. The plurality of permanent magnets 11 are arranged at substantially regular angular intervals in the circumferential direction.

The rotating electrical machine 100 further includes a stator core 20 disposed so as to face the rotor core 10 in the radial direction. The stator core 20 includes a plurality of teeth 21 and a plurality of slots 22 each located between adjacent ones of the teeth 21. Concentric coils 30 each formed by concentrically winding a rectangular wire are placed in the slots 22 of the stator core 20.

(Structure of Concentric Coil)

Figure 2:
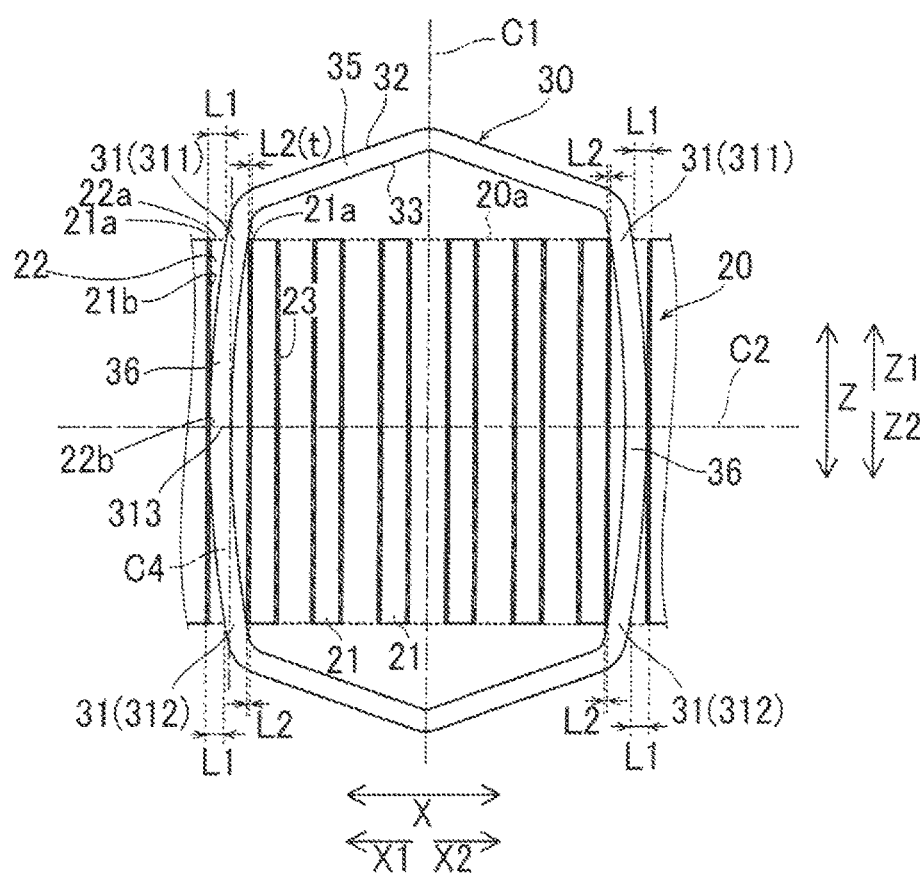
FIG. 2 is a schematic view of a single concentric coil placed in slots of the rotating electrical machine according to the first embodiment of the present disclosure.
Figure 3:
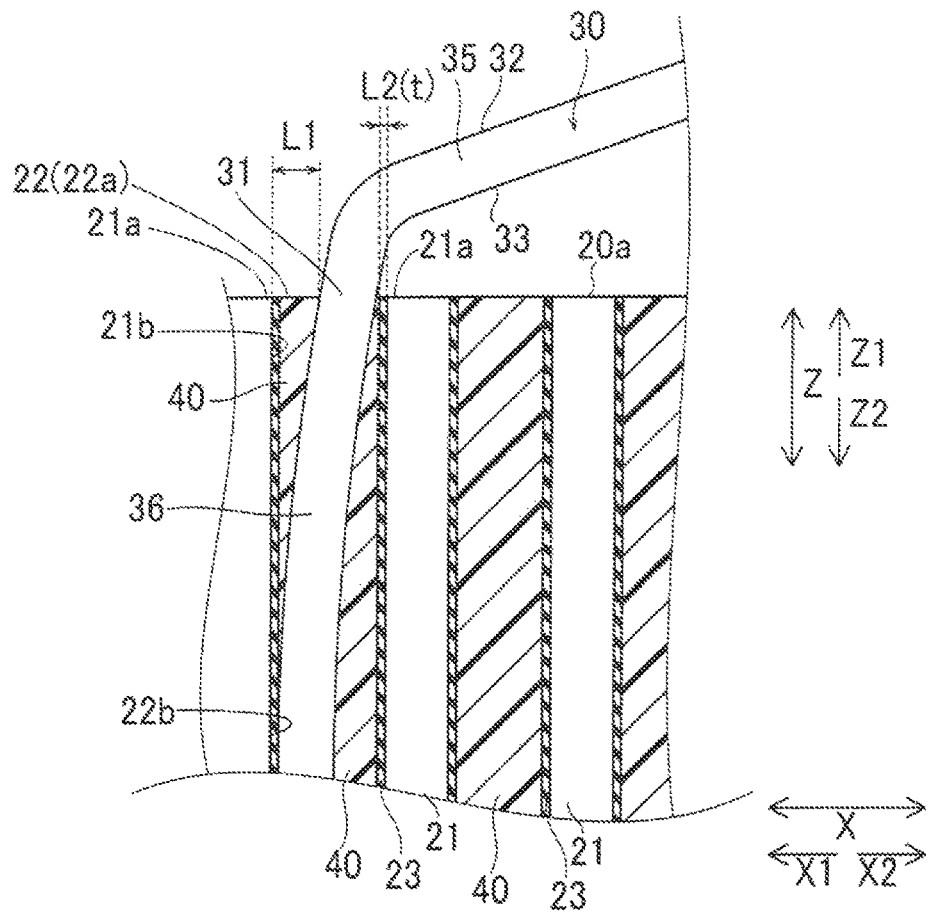
FIG. 3 is a partial enlarged view of FIG. 2.

The structure of the concentric coil 30 will be described with reference to FIGS. 2 and 3. FIG. 2 is a schematic view of the annular stator core 20 laid out flat, showing the radially inner side of the stator core 20 as viewed from the central axis of rotation of the rotor core 10. FIG. 3 is a partial enlarged view of FIG. 2. FIG. 2 shows a single concentric coil 30 placed in the slots 22 of the stator core 20. The concentric coil 30 has a substantially symmetrical shape with respect to an axis C1 in the Z direction which passes through the center of the concentric coil 30, so that the X1 direction side and the X2 direction side of the concentric coil 30 are mirror images of each other. The structure of the X1 direction side of the concentric coil 30 will be described below.

The concentric coil 30 is a coil formed by concentrically winding a rectangular wire and is placed in the slots 22 of the stator core 20. As shown in FIGS. 2 and 3, an interval L1 between a coil portion 31 of the concentric coil 30 which is located at an axial end 22a of the slot 22 and an axial end 21a of one of the adjacent teeth 21 which is located on the side (X1 direction side) facing an outer peripheral surface 32 of the coil portion 31 is larger than an interval L2 between the coil portion 31 and an axial end 21a of the tooth 21 located on the side (X2 direction side) facing an inner peripheral surface 33 of the coil portion 31.

Specifically, insulating paper 23 is placed between the slot 22 and the concentric coil 30. The inner peripheral surface 33 of the coil portion 31 is in contact with the insulating paper 23. The coil portion 31 and the axial end 21a of the tooth 21 located on the side (X2 direction side) facing the inner peripheral surface 33 of the coil portion 31 are separated by the interval L2 corresponding to the thickness t of the insulating paper 23.

As shown in FIG. 2, the interval L1 between each of the coil portions 31 (coil portions 311, 312) of the concentric coil 30 which are located at both ends on one side (Z1 direction side) and the other side (Z2 direction side) in the axial direction (Z direction) of the slot 22 and each of the axial ends 21a of the tooth 21 located on the side (X1 direction side) facing the outer peripheral surface 32 of the coil portions 31 is larger than the interval L2 between each of the coil portions 31 (coil portions 311, 312) and each of the axial ends 21a of the tooth 21 located on the side (X2 direction side) facing the inner peripheral surface 33 of the coil portions 31.

As shown in FIG. 3, the interval L1 between the concentric coil 30 and a corresponding portion 21b of the tooth 21 located on the side (X1 direction side) facing the outer peripheral surface 32 of the concentric coil 30 gradually decreases from the axial end 22a of the slot 22 toward an axial middle part 22b of the slot 22. Specifically, the interval L1 between the concentric coil 30 and the corresponding portion 21b of the tooth 21 located on the side facing the outer peripheral surface 32 of the concentric coil 30 gradually decreases a from the axial end 22a of the slot 22 and toward the vicinity of the axial middle part 22b of the slot 22 so that the interval L1 between the concentric coil 30 and the corresponding portion 21b of the tooth 21 is the smallest in the vicinity of the axial middle part 22b of the slot 22. The outer peripheral surface 32 of the concentric coil 30 and the insulating paper 23 are in contact with each other in the vicinity of the axial middle part 22b of the slot 22.

As shown in FIG. 2, the concentric coil 30 has a substantially symmetrical shape with respect to an axis C2 in the X direction which passes through the center of the concentric coil 30, so that the Z1 direction side and the Z2 direction side of the concentric coil 30 are mirror images of each other. That is, in both of the coil portion 311 and the coil portion 312, the interval L1 between the concentric coil 30 and the corresponding portion 21b of the tooth 21 located on the side (X1 direction side) facing the outer peripheral surface 32 of the concentric coil 30 gradually decreases from the axial end 22a of the slot 22 toward the axial middle part 22b (the vicinity of the axial middle part 22b) of the slot 22.

Namely, the concentric coil 30 is placed in the slot 22 such that the coil portions 31 (311, 312) of the concentric coil 30 which are located at the axial ends 22a of the slot 22 are located closer to the axis C1 of the concentric coil 30. The concentric coil 30 is also placed in the slot 22 such that a coil portion 313 of the concentric coil 30 which is located in the vicinity of the axial middle part 22b of the slot 22 is located farther away from the axis C1 of the concentric coil 30.

A slot accommodated portion 36 of the concentric coil 30 which is accommodated in the slot 22 thus includes a substantially arc-shaped part. The substantially arc-shaped part of the slot accommodated portion 36 is formed by winding a rectangular wire into the shape of an edgewise coil or a flatwise coil.

The substantially arc-shaped part of the slot accommodated portion 36 has a substantially arc shape protruding convexly in the circumferential direction of the stator core 20 from the positions of the axial ends 22a of the slot 22 toward the outer periphery of the concentric coil 30 with respect to an axis C4 (see FIG. 2) in the direction of the rotation axis (Z direction) which extends along the centerline of the slot 22 where the concentric coil 30 is placed. In the case where the axis C1 in the direction of the rotation axis which passes through the center of the concentric coil 30 is parallel to the axis C4 of the tooth 21 (slot 22), the substantially arc-shaped part of the slot accommodated portion 36 has a substantially arc shape protruding convexly in the circumferential direction of the stator core 20 (X direction) from the positions of the axial ends 22a of the slot 22 toward the outer periphery of the concentric coil 30 with respect also to the axis C1 in the direction of the rotation axis (Z direction) which passes through the center of the concentric coil 30. That is, the concentric coil 30 (slot accommodated portions 36) has a drum shape (barrel shape).

A single slot accommodated portion 36 has a single substantially arc-shaped part. The slot accommodated portion 36 is in contact with the teeth 21 at three positions with the insulating paper 23 therebetween, namely at the axial ends 22a (both ends) and the axial middle part 22b (the top of the arc, in the vicinity the axis C2 in the X direction which passes through the center of the concentric coil 30) of the slot 22. The slot accommodated portion 36 thus has a curved shape in the circumferential direction of the stator core 20 and is placed in the slot 22 so as to contact the teeth 21 at a plurality of positions with the insulating paper 23 therebetween. This improves heat transfer properties between the concentric coil 30 and the teeth 21 and improves cooling properties even when the stator core 20 is cooled with oil etc. The insulating paper 23 is one example of the "insulating material."

(Structure of Two Concentric Coils Placed in Slot)

Figure 4:
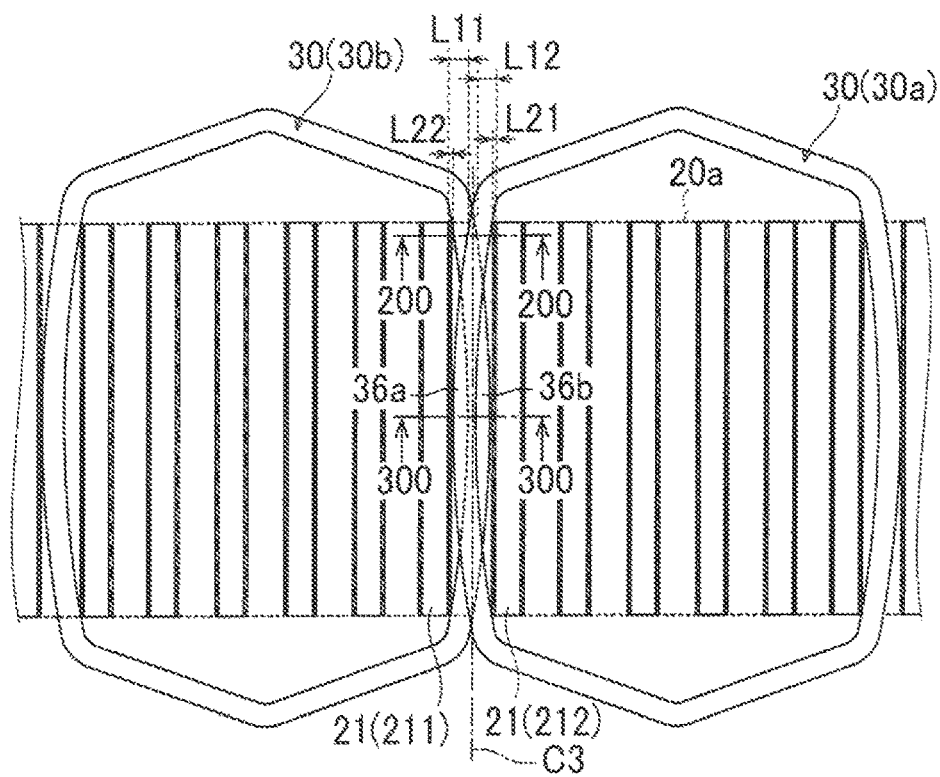
FIG. 4 is a schematic view of two concentric coils placed in slots of the rotating electrical machine according to the first embodiment of the present disclosure.
Figure 5:
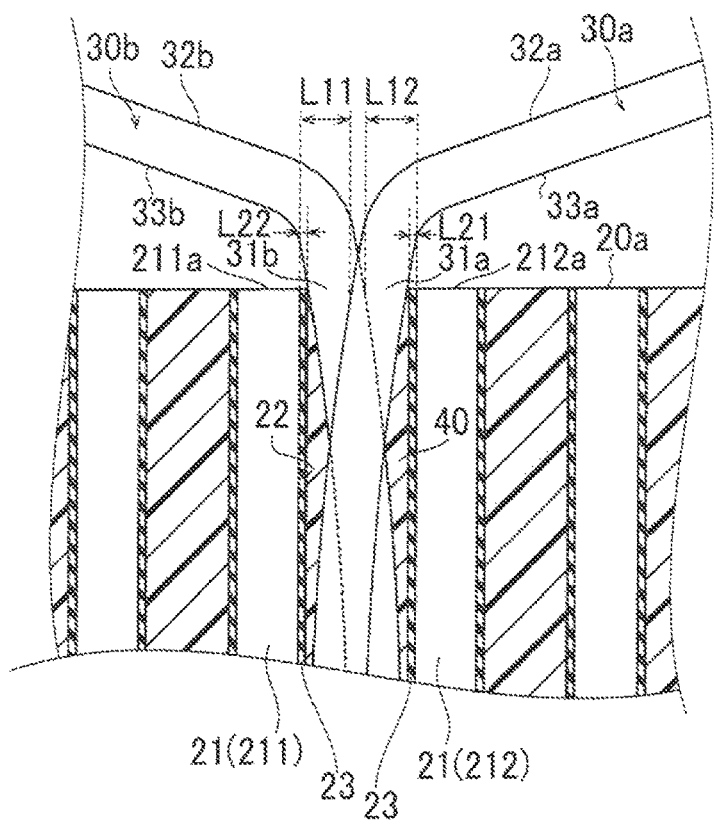
FIG. 5 is a partial enlarged view of FIG. 4.

The structure of two concentric coils 30 placed in a single slot 22 will be described with reference to FIGS. 4 to 9. FIG. 4 is a schematic view of the annular stator core 20 laid out flat, showing the radially inner side of the stator core 20 as viewed from the central axis of rotation of the rotor core 10. FIG. 5 is a partial enlarged view of FIG. 4. Although two concentric coils 30 (30a, 30b) placed in a single slot 22 are shown in FIG. 4, two concentric coils 30 (30a, 30b) are actually placed in every slot 22.

As shown in FIG. 5, the concentric coils 30 include a first concentric coil 30a and a second concentric coil 30b which are placed in the same slot 22 located between a first tooth 211 and a second tooth 212 which are adjacent to each other. An outer peripheral surface 32a of a first coil portion 31a of the first concentric coil 30a faces the first tooth 211, and an outer peripheral surface 32b of a second coil portion 31b of the second concentric coil 30b faces the second tooth 212.

An interval L11 between the first coil portion 31a of the first concentric coil 30a and an axial end 211a of the first tooth 211 facing the outer peripheral surface 32a of the first coil portion 31a of the first concentric coil 30a is larger than an interval L21 between the first coil portion 31a of the first concentric coil 30a and an axial end 212a of the second tooth 212 facing an inner peripheral surface 33a of the first coil portion 31a. The interval L11 is equal to the interval L1, and the interval L21 is equal to the interval L2.

An interval L12 between the coil portion 31b of the second concentric coil 30b and the axial end 212a of the second tooth 212 facing the outer peripheral surface 32b of the second coil portion 31b of the second concentric coil 30b is larger than an interval L22 between the second coil portion 31b of the second concentric coil 30b and the axial end 211a of the first tooth 211 facing an inner peripheral surface 33b of the second coil portion 31b. The interval L12 is equal to the interval L1, and the interval L22 is equal to the interval L2.

Figure 6:
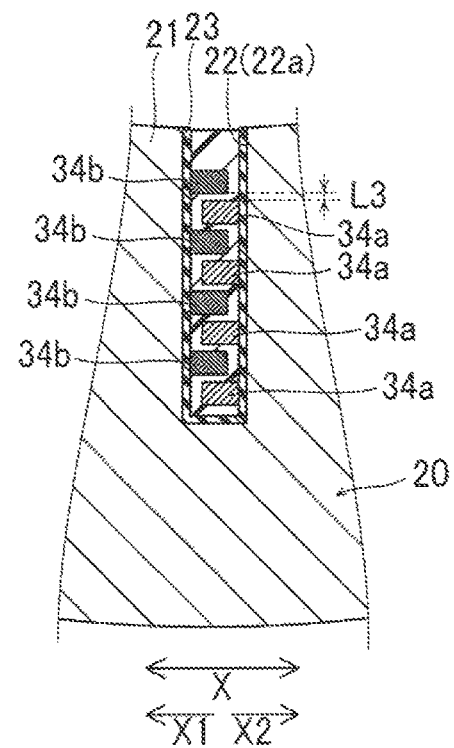
FIG. 6 is a sectional view taken along line 200-200 in FIG. 4.
Figure 7:
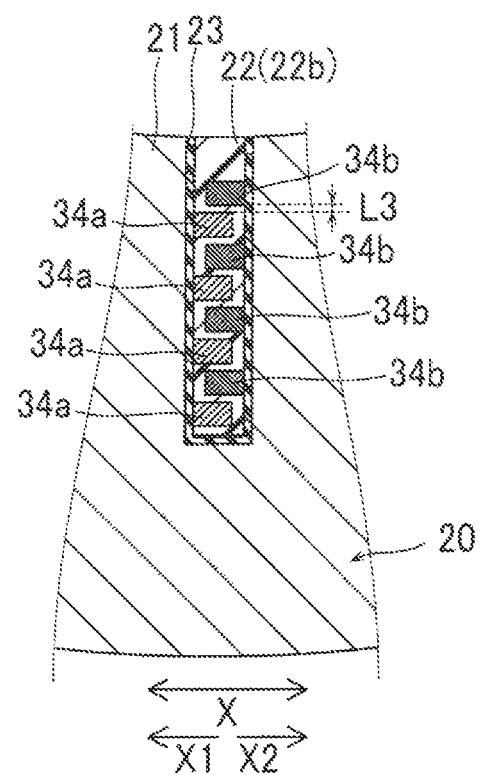
FIG. 7 is a sectional view taken along line 300-300 in FIG. 4.

As shown in FIGS. 6 and 7, the first concentric coil 30a and the second concentric coil 30b are formed by concentrically winding a rectangular wire 34a and a rectangular wire 34b into a plurality of turns. In the same slot 22 where the first concentric coil 30a and the second concentric coil 30b are placed, the turns of the rectangular wire 34a of the first concentric coil 30a and the turns of the rectangular wire 34b of the second concentric coil 30b are alternately arranged at intervals L3 in the radial direction.

Specifically, as shown in FIG. 6, on the axial end 22a side of the slot 22, the turns of the rectangular wire 34a of the first concentric coil 30a are placed on the X2 direction side of the slot 22, and the turns of the rectangular wire 34b of the second concentric coil 30b are placed on the X1 direction side of the slot 22. As shown in FIG. 7, in the vicinity of the axial middle part 22b of the slot 22, the turns of the rectangular wire 34a of the first concentric coil 30a are placed on the X1 direction side of the slot 22, and the turns of the rectangular wire 34b of the second concentric coil 30b are placed on the X2 direction side of the slot 22. That is, the turns of the rectangular wire 34a of the first concentric coil 30a and the turns of the rectangular wire 34b of the second concentric coil 30b are arranged so as to cross each other in the slot 22 as viewed from the radially inner side of the stator core 20.

That is, as shown in FIG. 4, a substantially arc-shaped part of a slot accommodated portion 36a of the first concentric coil 30a and a substantially arc-shaped part of a slot accommodated portion 36b of the second concentric coil 30b are placed substantially symmetrically with respect to an axis C3 in the direction of the rotation axis (Z direction) which extends along the centerline of the same slot 22 where the first concentric coil 30a and the second concentric coil 30b are placed.

(Shape in Radial Direction of Concentric Coil)

Figure 8:
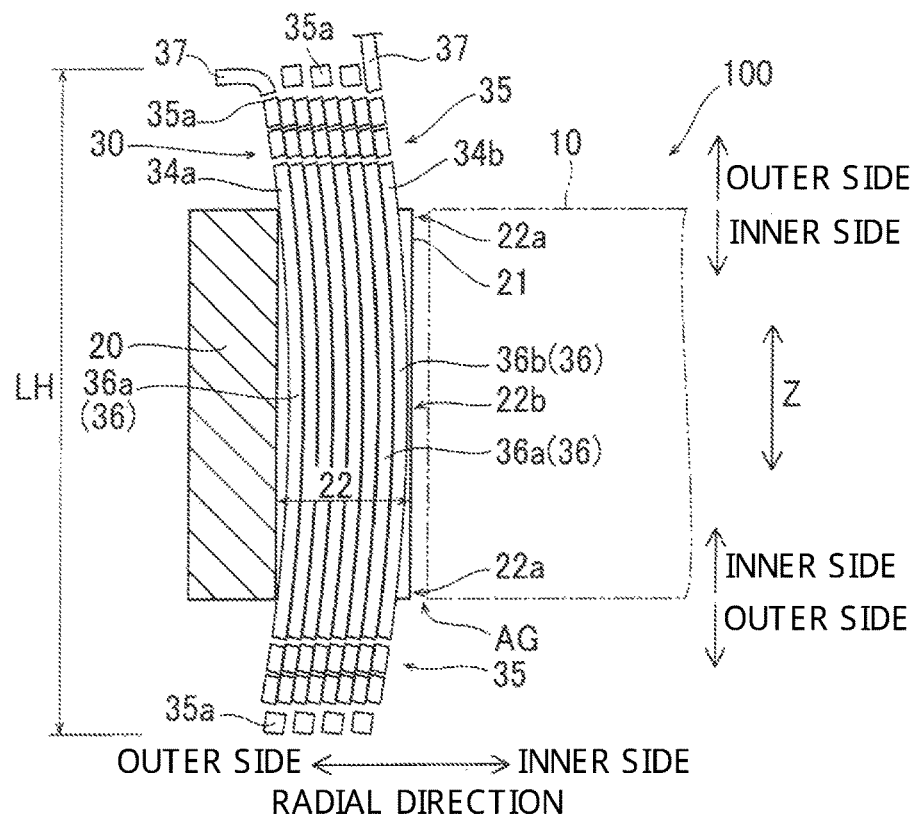
FIG. 8 is sectional view taken along line 400-400 in FIG. 1.

As shown in FIG. 8, each concentric coil 30 includes the slot accommodated portion 36 placed in the slot 22 of the stator core 20 and coil end portions 35 projecting in the axial direction (Z direction) from the stator core 20.

In the first embodiment, of the slot accommodated portions 36 of the concentric coils 30, axial ends of the slot accommodated portion 36 located on the side facing the rotor core 10 are located closer to the outside in the radial direction than an axial middle part of the slot accommodated portion 36 located on the side facing the rotor core 10 is.

In the first embodiment, of the concentric coils 30, axial outer ends of the coil end portions 35 located on the side facing the rotor core 10 are located closer to the outside in the radial direction than the axial ends of the slot accommodated portion 36 located on the side facing the rotor core 10 are.

In the example of FIG. 8, the concentric coils 30 have a curved (tilted) shape in the radial direction. That is, each of the slot accommodated portions 36 (slot accommodated portions 36a, 36b) of the concentric coils 30 (the first concentric coil 30a and the second concentric coil 30b) includes a curved part that is curved in the radial direction.

The slot accommodated portions 36 (36a, 36b) in the same slot 22 have a curved (tilted) shape in the radial direction of the stator core 20 so that axial (Z direction) middle parts of the slot accommodated portions 36 are located closer to the rotor core 10 (the inside in the radial direction). The axial middle parts of the slot accommodated portions 36 are parts that are placed in the axial middle part 22b of the slot 22. The slot accommodated portions 36a, 36b are curved (tilted) so that those parts of the slot accommodated portions 36a, 36a which are disposed in the axial middle part 22b of the slot 22 are located closer to the rotor core 10 than those parts of the slot accommodated portions 36a, 36a which are disposed in the axial ends 22a (both ends) of the slot 22 are. More specifically, the slot accommodated portions 36a, 36b are curved in a substantially arc shape (arch shape) so that axial middle parts of the slot accommodated portions 36a, 36b are located closest to the rotor core 10. In other words, the slot accommodated portions 36 are tilted so as to be located closer to the outside in the radial direction as they extend closer to the axial ends 22a (both ends) of the slot 22. The axial middle parts of the slot accommodated portions 36 are located on the outer side in the radial direction with respect to tip end faces of the teeth 21.

Each concentric coil 30 has a pair of coil end portions 35 that are continuous with the slot accommodated portion 36 and that extend outward to both sides in the axial direction from the slot 22. In the first embodiment, each of the pair of coil end portions 35 has a tilted (curved) shape so that an axial outer end 35a of the coil end portion 35 is located closer to the outside in the radial direction than a part of the coil end portion 35 which is located closer to the slot accommodated portion 36 is. In other words, each of the pair of coil end portions 35 is tilted so that the part of the coil end portion 35 which is located closer to the slot accommodated portion 36 is located closer to the rotor core 10 than the axial outer end 35a of the coil end portion 35 is. Each of the coil end portions 35 is tilted (curved) so as to be located closer to the outside in the radial direction as it extends farther away from the axial end 22a of the slot 22 and closer to the outside in the axial direction. Radial outer ends of the coil end portions 35 are located on the outer side in the radial direction with respect to a radial outer end of the slot 22 (root portions of the teeth 21) and are located above (axially outside) a back yoke.

In the first embodiment, the slot accommodated portion 36 and the pair of coil end portions 35 extending from both axial ends of the slot accommodated portion 36 are continuously curved in the radial direction. That is, the slot accommodated portion 36 and the pair of coil end portions 35 are tilted so as to be curved in the radial direction, and have a continuously curved shape so that an axial middle part of the overall shape of the slot accommodated portion 36 and the pair of coil end portions 35 is located closer to the rotor core 10. Specifically, the slot accommodated portion 36 and the pair of coil end portions 35 are curved in a substantially arc shape (arch shape) toward the rotor core 10 along the entire axial length LH from the outer end 35a of one of the coil end portions 35 through the slot accommodated portion 36 to the outer end 35a of the other coil end portion 35. The pair of coil end portions 35 correspond to both end portions of the arc shape and are curved so as to be tilted outward in the radial direction. As described above, the slot accommodated portions 36a, 36b are placed so that the axial middle parts of the slot accommodated portions 36a, 36b are located closest to the rotor core 10. Accordingly, the axial middle part of the radially outermost slot accommodated portion 36 (36a) in the slot 22 is separated from an inner surface of the stator core 20. Lead portions 37 for electrically connecting each concentric coil 30 are placed axially outside the coil end portions 35.

(Description of Supply of Cooling Medium to Coil)

Figure 9:
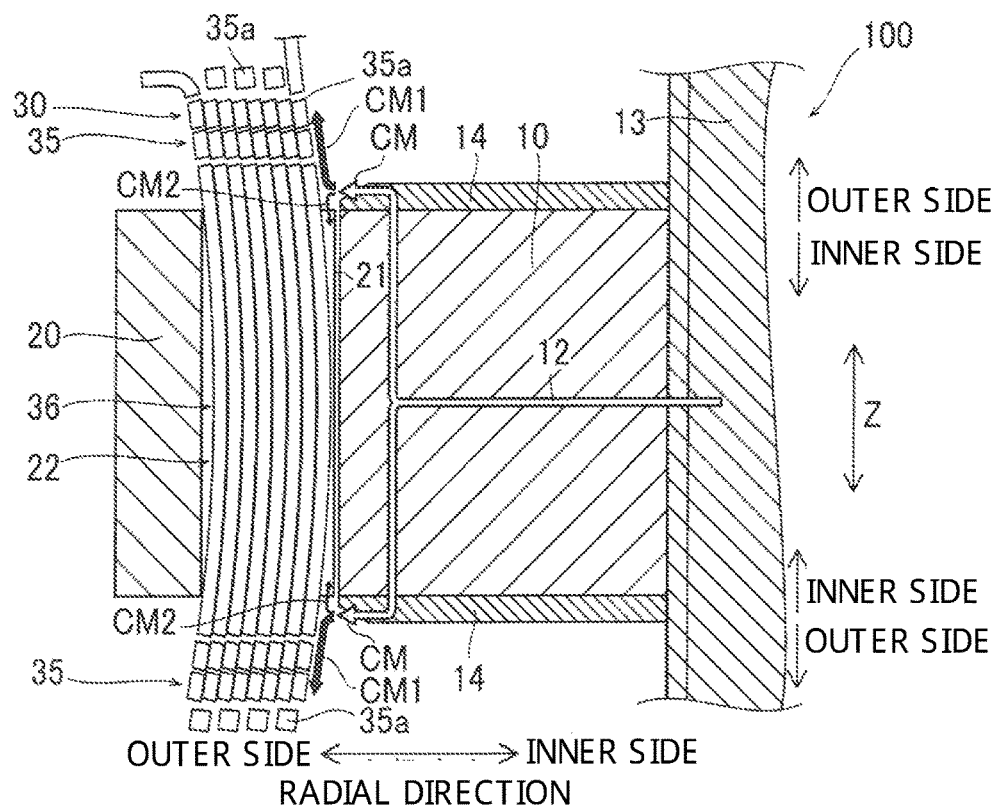
FIG. 9 is a schematic sectional view illustrating a cooling medium flow path in a rotor core.

As shown in FIG. 9, the rotor core 10 includes a cooling medium flow path 12 through which a cooling medium CM can be discharged toward the tilted coil end portions 35 with rotation of the rotor core 10. For example, the cooling medium is cooling oil. The cooling medium flow path 12 extends through a rotor shaft 13 engaged with the rotor core 10, the rotor core 10, and end plates 14 of the rotor core 10 and opens toward the stator core 20 (outward in the radial direction). The cooling medium CM supplied to the cooling medium flow path 12 by an oil pump, not shown, is pushed through the cooling medium flow path 12 by a centrifugal force caused by rotation of the rotor core 10 and is discharged (ejected) through openings toward the coil end portions 35 located on the outer side in the radial direction.

The cooling medium flow path 12 is schematically shown in the configuration example of FIG. 9, and the shape (structure) of the cooling medium flow path 12 is not limited to the illustrated shape (structure). In FIG. 9, the openings of the cooling medium flow path 12 face outward in the radial direction, so that the cooling medium flow path 12 discharges (ejects) the cooling medium CM outward in the radial direction. The cooling medium CM may be discharged in a direction other than the radial direction. For example, the cooling medium CM may be discharged in a direction tilted outward in the axial direction (Z direction) (at a certain angle of elevation) with respect to the radial direction.

(Description of Varnish filling Slots)

Varnish 40 filling the slots 22 will be described with reference to FIGS. 3 and 5 to 7. The varnish 40 filling the slots 22 is not shown in FIGS. 1, 2, 4, 8, and 9.

As shown in FIGS. 3 and 5 to 7, the varnish 40 fills between each concentric coil 30 and the insulating paper 23 placed in the slot 22. That is, as shown in FIG. 3, the varnish 40 fills between the coil portion 31 and the tooth 21 located on the side facing the outer peripheral surface 32 of the coil portion 31 and between the coil portion 31 and the tooth 21 located on the side facing the inner peripheral surface 33 of the coil portion 31. As shown in FIGS. 6 and 7, the varnish 40 fills between each turn of the rectangular wire 34a of the first concentric coil 30a and each turn of the rectangular wire 34b of the second concentric coil 30b which face each other in the radial direction.

Effects of Structure of First Embodiment

The first embodiment has the following effects.

In the first embodiment, as shown in FIG. 8, of the slot accommodated portions 36 of the concentric coils 30, the axial ends of the slot accommodated portion 36 located on the side facing the rotor core 10 are located closer to the outside in the radial direction than the axial middle part of the slot accommodated portion 36 located on the side facing the rotor core 10 is. If the slot accommodated portion 36 has a linear shape, the cooling medium CM easily flows into the slot 22 along the slot accommodated portion 36. However, the configuration of the first embodiment can make it less likely for the cooling medium CM to flow into (toward the axial middle part of) the slot 22 (make it easier for the cooling medium CM to flow toward the axial ends) by the centrifugal force of the rotor core 10. This can reduce the amount of cooling medium CM that flows into the slot 22 along the slot accommodated portion 36 when the cooling medium CM is discharged onto the concentric coil 30. Entry of the cooling medium CM into an airgap AG between the stator core 20 and the rotor core 10 can thus be reduced. Since the amount of cooling medium CM to be supplied to the concentric coil 30 need not be reduced in order to reduce entry of the cooling medium CM into the airgap AG entry of the cooling medium CM into the airgap AG can be reduced while ensuring cooling performance for the concentric coil 30.

In the first embodiment, as shown in FIG. 8, of the slot accommodated portions 36 of the concentric coils 30, the axial outer ends of the coil end portions 35 located on the side facing the rotor core 10 are located closer to the outside in the radial direction than the axial ends of the slot accommodated portion 36 located on the side facing the rotor core 10 are. The cooling medium CM that has cooled the coil end portions 35 is thus more easily discharged toward the axial outer ends of the coil end portions 35 which are located closer to the outside in the radial direction. This can reduce the amount of cooling medium CM that flows into the slot 22 along the slot accommodated portion 36 and can thus reduce entry of the cooling medium CM into the airgap AG between the stator core 20 and the rotor core 10.

Since the amount of cooling medium CM to be supplied need not be reduced in order to reduce entry of the cooling medium CM into the airgap AG, entry of the cooling medium CM into the airgap AG can be reduced while ensuring cooling performance for the concentric coil 30.

In the first embodiment, as shown in FIG. 8, the slot accommodated portion 36 may have a curved (tilted) shape in the radial direction of the stator core 20 so that the axial middle part of the slot accommodated portion 36 is located closer to the rotor core 10. This can reduce clearance in the radial direction from the slot accommodated portion 36 to the rotor core 10 and can thus reliably reduce entry of the cooling medium CM into the airgap AG.

In the first embodiment, as shown in FIG. 8, each coil end portion 35 may have a tilted shape so that the axial outer end 35a is located closer to the outside in the radial direction than the part of the coil end portion 35 which is located closer to the slot accommodated portion 36 is. As shown in FIG. 9, this allows the cooling medium CM to flow in the direction in which the coil end portions 35 are tilted (outward in the axial direction and outward in the radial direction), when the cooling medium CM is ejected from the rotor core 10 located on the inner side in the radial direction to the pair of coil end portions 35. This can further reduce the amount of cooling medium CM2 that flows toward the slot accommodated portion 36 located on the inner side in the axial direction and can further increase the amount of cooling medium CM1 that flows toward the outer ends 35a. As a result, entry of the cooling medium CM into the airgap AG can be more effectively reduced.

Figure 10:
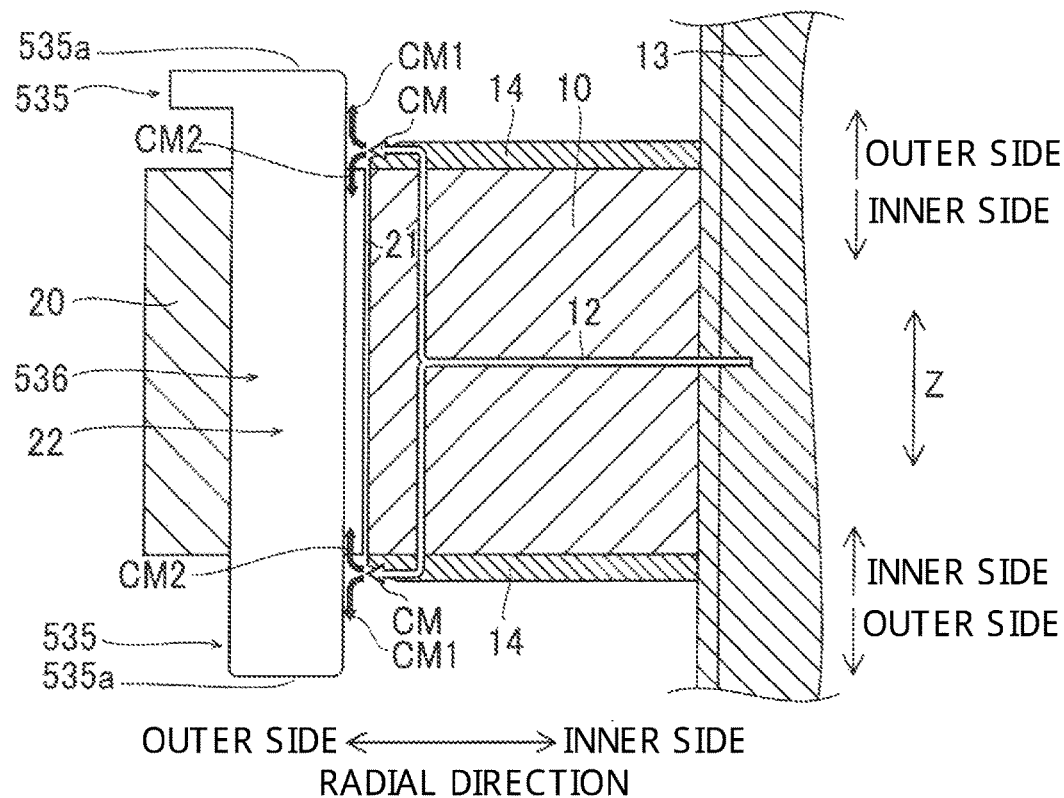
FIG. 10 is a diagram illustrating how a cooling medium is discharged to coil end portions in a comparative example.

More specifically, for example, it is assumed that a slot accommodated portion 536 and coil end portions 535 extend straight in the axial direction (Z direction) as in a comparative example shown in FIG. 10. In this case, when the cooling medium CM is discharged in the radial direction, the amount of cooling medium CM2 that flows toward the slot accommodated portion 536 is approximately equal to the amount of cooling medium CM1 that flows toward the outer ends 535a (CM1≈CM2). In the configuration example of the first embodiment shown in FIG. 9, however, when the cooling medium CM is discharged in the radial direction, a larger amount of cooling medium CM1 flows toward the outer ends 35a along the tilted coil end portions 35 (CM1>>CM2). Entry of the cooling medium CM into the airgap AG (toward the slot accommodated portion 36) is thus effectively reduced.

In the first embodiment, as shown in FIG. 9, the rotor core 10 may have the cooling medium flow path 12 through which the cooling medium CM can be discharged toward the tilted coil end portions 35 with rotation of the rotor core 10. In this case, the cooling medium CM can be ejected outward in the radial direction from the rotor core 10 located on the inner peripheral side to the tilted coil end portions 35, whereby the ejected cooling medium CM can be more reliably made to flow toward the outer ends 35a, as compared to the case where, e.g., a casing accommodating the rotor core 10 and the stator core 20 is provided with an injector etc. and a cooling medium is supplied form the injector.

In the first embodiment, as shown in FIGS. 8 and 9, the slot accommodated portion 36 and the pair of coil end portions 35 may be tilted so as to be curved in the radial direction and may have a continuously curved shape so that the axial middle part of the overall shape of the slot accommodated portion 36 and the pair of coil end portions 35 is located closer to the rotor core 10. This can more effectively reduce entry of the cooling medium CM into the airgap AG as compared to the case where only the slot accommodated portion 36 is curved. As described later, the overall shape that is curved toward the rotor core 10 can be implemented by merely pressing outward in the radial direction the pair of coil end portions 35 of the concentric coil 30 placed on the inner side in the radial direction of the stator core 20. Accordingly, the concentric coil 30 having a curved shape and capable of reducing entry of the cooling medium CM into the airgap AC can be easily produced.

(Manufacturing Method of Rotating Electrical Machine)

Figure 12:
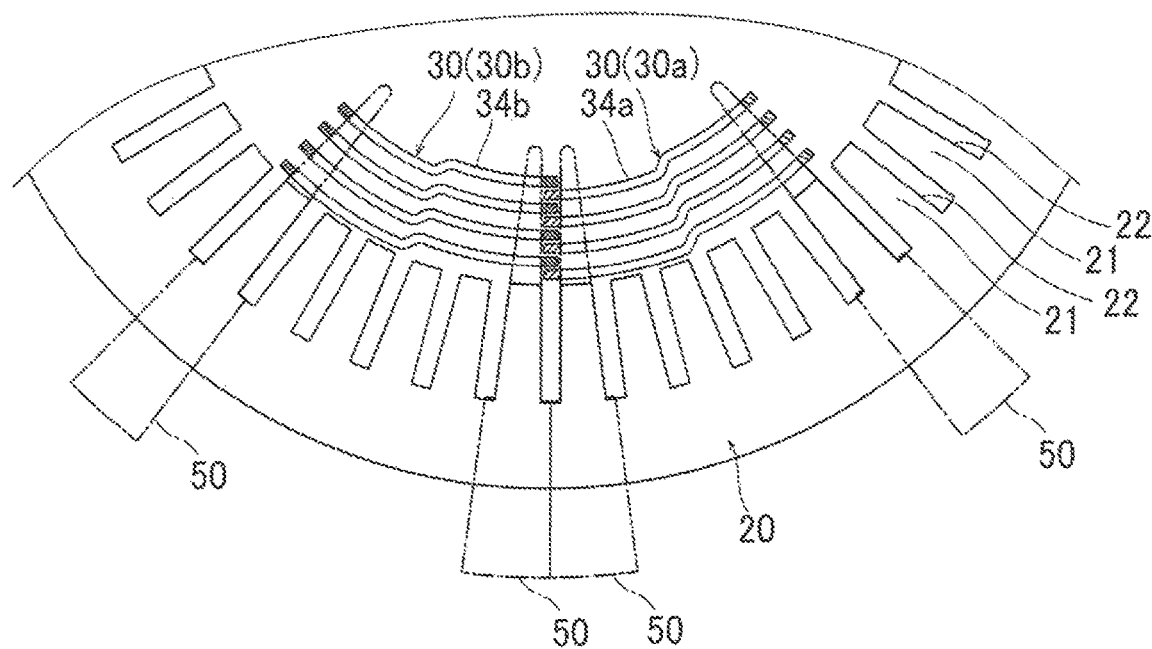
FIG. 12 is a diagram illustrating the step of placing concentric coils into slots.
Figure 13:
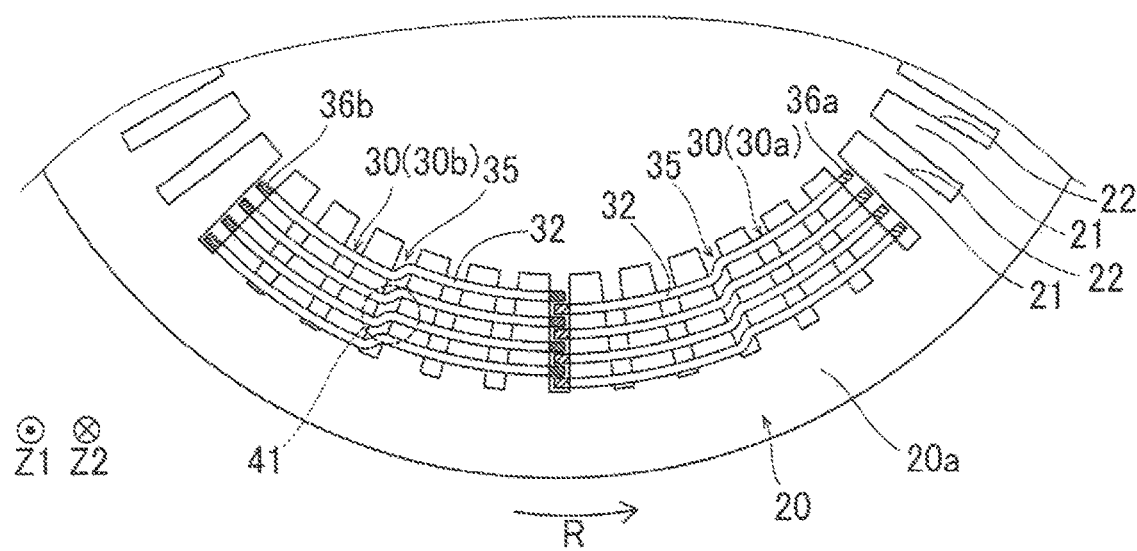
FIG. 13 is a diagram illustrating the step of dropping varnish onto concentric coils.
Figure 14:
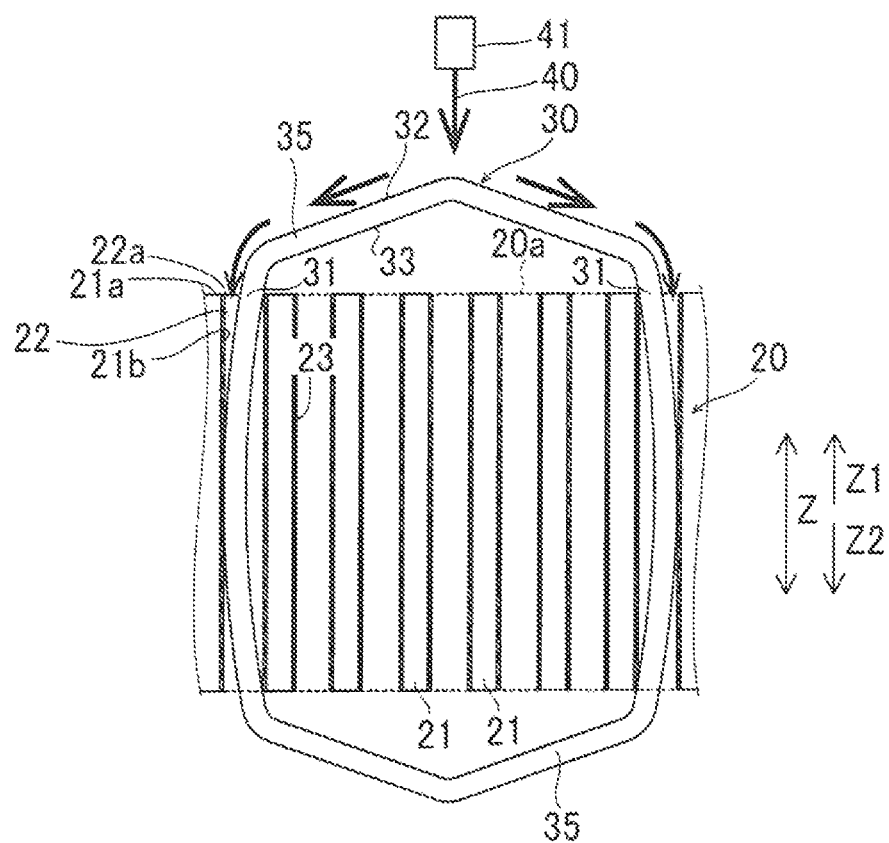
FIG. 14 is a diagram showing how varnish is dropped onto a concentric coil.

A method for manufacturing the rotating electrical machine 100 will be described with reference to FIGS. 1, 8, and 11 to 14. FIGS. 12 and 13 show two concentric coils 30 (the first concentric coil 30a and the second concentric coil 30b) being placed in the slots 22 of the stator core 20. FIG. 14 is a schematic view of the annular stator core 20 laid out flat, showing the radially inner side of the stator core 20 as viewed from the central axis of rotation of the rotor core 10.

Figure 11:
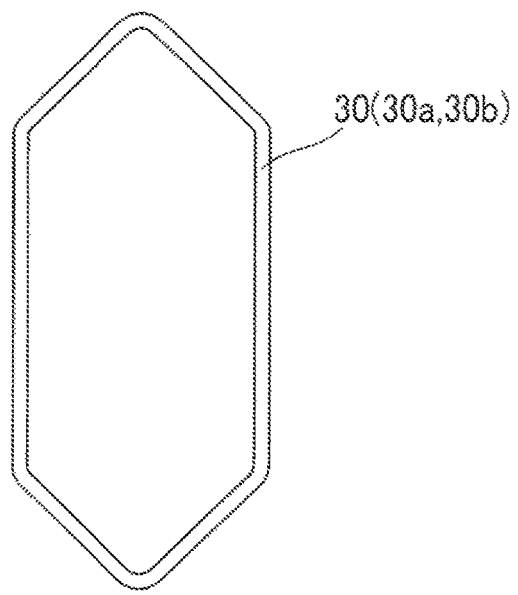
FIG. 11 is a diagram showing a concentric coil that has not been placed in slots.

As shown in FIG. 11, the concentric coils 30 (the first concentric coil 30a and the second concentric coil 30b) each formed by concentrically winding a rectangular wire are prepared.

As shown in FIG. 12, the first concentric coil 30a and the second concentric coil 30b are then attached to a jig 50 such that the turns of the rectangular wire 34a of the first concentric coil 30a and the turns of the rectangular wire 34b of the second concentric coil 30b are alternately arranged in the radial direction.

Subsequently, as shown in FIG. 13, each concentric coil 30 is placed in the slots 22 such that the slot accommodated portion 36 and the pair of coil end portions 35 are tilted so as to be curved in the radial direction and have a continuously curved shape so that the axial middle part of the overall shape of the slot accommodated portion 36 and the pair of coil end portions 35 is located closer to the rotor core 10. Specifically, the concentric coils 30 (the first concentric coil 30a and the second concentric coil 30b) attached to the jig 50 are pressed outward in the radial direction so as to be inserted into the slots 22.

As shown in FIG. 8, each concentric coil 30 is inserted by pressing the pair of coil end portions 35 outward from the inside in the radial direction. Since the slot accommodated portion 36 is subjected to sliding resistance, the pair of coil end portions 35 of each concentric coil 30 first move outward in the radial direction, and the slot accommodated portion 36 is pulled by the coil end portions 35 and moved outward in the radial direction into the slot 22. As a result, at the time the pressing is finished, the pair of coil end portions 35 located on both outer sides in the axial direction are tilted outward in the radial direction and the slot accommodated portion 36 located in the middle in the axial direction is located at a position shifted relatively inward in the radial direction in the slot 22. The overall shape of the concentric coil 30 is therefore an arc shape curved radially inward in the middle in the axial direction.

Regarding the circumferential direction, each concentric coil 30 is gradually widened in the circumferential direction and changes from the shape shown in FIG. 11 into the shape (barrel shape) shown in FIG. 14, namely such a shape that the inside width in the circumferential direction is large and those portions of the concentric coil 30 which are located in the slots 22 are curved in the axial direction. As a result, the interval L1 (see FIG. 2) between the coil portion 31 of the concentric coil 30 which is located at the axial end 22a of the slot 22 and the axial end 21a of one of the adjacent teeth 21 which is located on the side facing the outer peripheral surface 32 of the coil portion 31 is larger than the interval L2 between the coil portion 31 and the axial end 21a of the tooth 21 located on the side facing the inner peripheral surface 33 of the coil portion 31.

Subsequently, as shown in FIG. 13, with the stator core 20 being placed so that its axial end face 20a faces upward (in the Z1 direction), the varnish 40 (see FIG. 14) is dropped from above to flow down along the outer peripheral surfaces 32 of the concentric coils 30, whereby the slots 22 are filled with the varnish 40. Specifically, with the stator core 20 being rotated in the circumferential direction (R direction), the varnish 40 is dropped onto the coil end portions 35 of the concentric coil 30 from a varnish dropping device 41 (see FIG. 14). As shown in FIG. 14, the varnish 40 thus flows down along the outer peripheral surfaces 32 of the concentric coils 30 (coil end portions 35) into the slots 22. In the vicinity of the axial end 22a of each slot 22, the varnish 40 is guided into the slot 22 mainly by gravity. On the axial middle part 22b side of each slot 22, the varnish 40 is guided into the slot 22 by capillary action in addition to gravity.

The varnish 40 is dropped on each side of the stator core 20, namely on one side (Z1 direction side) and the other side (Z2 direction side) of the stator core 20. The stator core 20 may be rotated 360 degrees, or if the varnish 40 is not sufficiently dropped onto a plurality of concentric coils 30 (into the slots 22) with the one full rotation of the stator core 20, the stator core 20 may be rotated 360 degrees a plurality of times with the radial position from which the varnish 40 is dropped being shifted after each full rotation of the stator core 20.

The varnish 40 thus fixes the concentric coils 30 and the insulating paper 23 and fixes the turns of the rectangular wires of the concentric coils 30. This improves heat transfer properties between the concentric coil 30 and the stator core 20.

Second Embodiment

Figure 15:
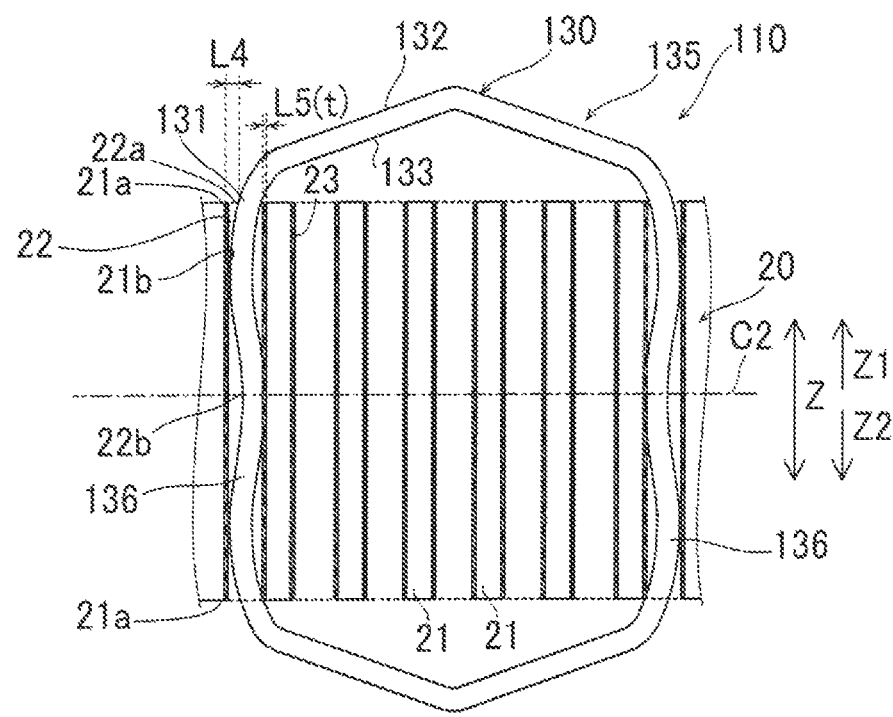
FIG. 15 is a diagram showing a single concentric coil placed in slots of a rotating electrical machine according to a second embodiment of the present disclosure.

The structure of a rotating electrical machine 110 according to a second embodiment will be described with reference to FIG. 15. FIG. 15 is a schematic view of an annular stator core 20 laid out flat, showing the radially inner side of the stator core 20 as viewed from the central axis of rotation of a rotor core 10.

As in the first embodiment, in a concentric coil 130 of the rotating electrical machine 110, an interval L4 between a coil portion 131 of the concentric coil 130 which is located at an axial end 22a of a slot 22 and an axial end 21a of one of adjacent teeth 21 which is located on the side facing an outer peripheral surface 132 of the coil portion 131 is larger than an interval L5 between the coil portion 131 and the axial end 21a of the tooth 21 located on the side facing an inner peripheral surface 133 of the coil portion 131.

The interval L4 between the concentric coil 130 and a corresponding portion 21b of the tooth 21 located on the side facing the outer peripheral surface 132 of the concentric coil 130 gradually decreases from the axial end 22a on the Z1 direction side of the slot 22 toward an axial middle part 22b of the slot 22, and then gradually increases toward the vicinity of the axial middle part 22b of the slot 22. The interval L4 then gradually decreases, and thereafter gradually increases toward an axial end 22a on the Z2 direction side. The portion of the concentric coil 130 which is placed in the slot 22 thus has a winding shape (wave shape). In other words, the portion of the concentric coil 130 which is placed in the slot 22 has a W-shape.

That is, each slot accommodated portion 136 has a plurality of substantially arc-shaped parts. Specifically, each slot accommodated portion 136 has two substantially arc-shaped parts projecting toward the outer periphery of the concentric coil 130 (and one substantially arc-shaped part recessed toward the inner periphery of the concentric coil 130). Each slot accommodated portion 136 has five parts that are in contact with the teeth 21. That is, each slot accommodated portion 136 is in contact with the teeth 21 at a total of five positions with insulating paper 23 therebetween, namely at the axial ends 22a (both ends) and the axial middle part 22b (the top of the arc, in the vicinity of an axis C2 in the X direction which passes through the center of the concentric coil 30) of the slot 22 and two positions between each of the axial end portions 22a and the axial middle part 22b.

In the second embodiment, the shapes in the radial direction of each slot accommodated portion 136 and each coil end portion 135 are similar to the first embodiment. Other configurations of the second embodiment and a method for manufacturing the rotating electrical machine 110 of the second embodiment are similar to the first embodiment.

Effects of Second Embodiment

The second embodiment has the following effects.

In the second embodiment as well, as in the first embodiment (see FIG. 8), the axial ends of the slot accommodated portion 136 located on the side facing the rotor core 10 are located closer to the outside in the radial direction than the axial middle part of the slot accommodated portion 136 located on the side facing the rotor core 10 is. This can make it less likely for the cooling medium CM to flow into the slot 22 (make it easier for the cooling medium CM to flow toward the axial ends) by the centrifugal force of the rotor core 10. Entry of the cooling medium CM into an airgap AG between the stator core 20 and the rotor core 10 can thus be reduced. The axial outer ends of the coil end portions 135 located on the side facing the rotor core 10 are located closer to the outside in the radial direction than the axial ends of the slot accommodated portion 136 located on the side facing the rotor core 10 are. The cooling medium CM that has cooled the coil end portions 135 is thus more easily discharged toward the axial outer ends of the coil end portions 135. Entry of the cooling medium CM into the airgap AG between the stator core 20 and the rotor core 10 can thus be reduced.

Other effects of the second embodiment are similar to those of the first embodiment.

[Modifications]

The embodiments disclosed herein are merely by way of example in all respects and should not be construed as restrictive.

For example, the first and second embodiments are described with respect to an example in which the substantially arc-shaped part or parts of the slot accommodated portion are formed by winding a rectangular wire into the shape of an edgewise coil or a flatwise coil. However, the present disclosure is not limited to this. In the present disclosure, the substantially arc-shaped part or parts of the slot accommodated portion may be formed by winding a wire other than a rectangular wire.

The first embodiment is described with respect to an example in which the overall shape of the slot accommodated portion and the pair of coil end portions has a substantially arc shape curved radially inward in the middle in the axial direction. However, the present disclosure is not limited to this. For example, not only the axial middle part of the slot accommodated portion but also those parts of the slot accommodated portion which are located close to both axial ends of the slot accommodated portion may protrude inward in the radial direction so that the overall shape of the slot accommodated portion and the pair of coil end portions has a curved portion with a trapezoidal shape. The "curved shape" may be an "arc shape," a "bow shape," or other curved shapes.

The first embodiment is described with respect to a configuration example in which the slot accommodated portion is curved toward the rotor core in the middle in the axial direction and is curved so as to be tilted outward in the radial direction as it extends the axial ends of the slot accommodated portion. However, the present disclosure is not limited to this. For example, the slot accommodated portion may be tilted straight outward in the radial direction. For example, the slot accommodated portion may be bent (discontinuously) to form stepped portions such that the axial ends of the slot accommodated portion are located closer to the outside in the radial direction than the axial middle part of the slot accommodated portion.

The first embodiment is described with respect to a configuration example in which the pair of coil end portions are curved so as to be tilted outward in the radial direction. However, the present disclosure is not limited to this. For example, the coil end portions may be tilted straight outward in the radial direction. For example, the coil end portions may be bent (discontinuously) to form stepped portions such that the axial outer ends of the coil end portions are located closer to the outside in the radial direction than the slot accommodated portion.

The first embodiment is described with respect to an example in which the substantially arc-shaped part of the slot accommodated portion has a convex shape protruding toward the outer periphery of the concentric coil. However, the present disclosure is not limited to this. For example, the substantially arc-shaped part of the slot accommodated portion may have a concave shape protruding toward the inner periphery of the concentric coil.

The second embodiment is described with respect to an example in which the slot accommodated portion has two convex portions protruding toward the outer periphery of the concentric coil. However, the present disclosure is not limited to this. For example, the slot accommodated portion may have three or more convex portions protruding toward the outer periphery of the concentric coil.

The first and second embodiments are described with respect to an example in which the inner peripheral surface of the coil portion is in contact with the insulating paper and the coil portion and the axial end of the tooth located on the side facing the inner peripheral surface of the coil portion are separated by the interval corresponding to the thickness of the insulating paper. However, the present disclosure is not limited to this. For example, the inner peripheral surface of the coil portion may not be in contact with the insulating paper.

The first and second embodiments are described with respect to an example in which the interval between the concentric coil and the corresponding portion of the tooth located on the side facing the outer peripheral surface of the concentric coil gradually decreases from the axial end of the slot toward the axial middle part of the slot. However, the present disclosure is not limited to this. For example, the concentric coil may be formed so that the interval between the concentric coil and the corresponding portion of the tooth located on the side facing the outer peripheral surface of the concentric coil does not change from the axial end of the slot toward the axial middle part of the slot. That is, the portion of the concentric coil which is placed in the slot may have a linear shape along the tooth (in the Z direction).

The first and second embodiments are described with respect to an example in which the interval between each of the coil portions of the concentric coil which are located at both ends on one side and the other side in the axial direction of the slot and the axial end of the tooth located on the side facing the outer peripheral surface of the coil portion is larger than the interval between each of the coil portions and the axial end of the tooth located on the side facing the inner peripheral surface of the coil portion. However, the present disclosure is not limited to this. For example, the concentric coil may be formed so that the interval between the coil portion of the concentric coil which is located at one of the ends on one side and the other side in the axial direction of the slot and the axial end of the tooth located on the side facing the outer peripheral surface of the coil portion is larger than the interval between the coil portion and the axial end of the tooth located on the side facing the inner peripheral surface of the coil portion.

The first and second embodiments are described with respect to an example in which two concentric coils are placed in the same slot. However, the present disclosure is not limited to this. For example, a single concentric coil or three or more concentric coils may be placed in the same slot.

The first and second embodiments are described with respect to an example in which insulating paper is placed between each slot and the concentric coil. However, the present disclosure is not limited to this. In the present disclosure, an insulating member other than insulating paper may be placed between each slot and the concentric coil.

The first and second embodiments are described with respect to an example in which the teeth are filled with varnish. However, the present disclosure is not limited to this. In the present disclosure, the teeth may be filled with a fixing agent other than varnish (e.g., an adhesive).

The first and second embodiments are described with respect to an example in which varnish is dropped onto the coil end portions of the concentric coils with the stator core being rotated. However, the present disclosure is not limited to this. For example, varnish may be dropped onto the coil end portions of the concentric coils with the stator core being held stationary.

The invention claimed is:

1. A rotating electrical machine, comprising:
a rotor core;
a stator core disposed so as to face the rotor core in a radial direction and including a plurality of teeth and a plurality of slots each located between adjacent ones of the teeth; and
a concentric coil formed by concentrically winding a wire, and including a slot accommodated portion placed in the slot of the stator core and a coil end portion projecting in an axial direction from the stator core, wherein
of the slot accommodated portion of the concentric coil, an axial end of the slot accommodated portion located on a side facing the rotor core is located closer to an outside in the radial direction than an axial middle part of the slot accommodated portion located on the side facing the rotor core.

2. The rotating electrical machine according to claim 1, wherein the slot accommodated portion has a curved shape in the radial direction of the stator core so that the axial middle part of the slot accommodated portion is located closer to the rotor core.

3. The rotating electrical machine according to claim 2, wherein
the coil end portion has a tilted shape so that an axial outer end of the coil end portion is located closer to the outside in the radial direction than a part of the coil end portion which is located closer to the slot accommodated portion.

4. The rotating electrical machine according to claim 3, wherein
the rotor core includes a cooling medium flow path through which a cooling medium can be discharged toward the tilted coil end portion with rotation of the rotor core.

5. The rotating electrical machine according to claim 4, wherein
the slot accommodated portion and the coil end portion are tilted so as to be curved in the radial direction, and have a continuously curved shape so that an axial middle part of an overall shape of the slot accommodated portion and the coil end portion is located closer to the rotor core.

6. The rotating electrical machine according to claim 5, wherein
the wire is a rectangular wire, and
the slot accommodated portion has a curved shape in a circumferential direction of the stator core as well as in the radial direction of the stator core and is placed in the slot so as to contact the teeth at a plurality of positions with an insulating material therebetween.

7. The rotating electrical machine according to claim 2, wherein
the wire is a rectangular wire, and
the slot accommodated portion has a curved shape in a circumferential direction of the stator core as well as in the radial direction of the stator core and is placed in the slot so as to contact the teeth at a plurality of positions with an insulating material therebetween.

8. The rotating electrical machine according to claim 3, wherein
the slot accommodated portion and the coil end portion are tilted so as to be curved in the radial direction, and have a continuously curved shape so that an axial middle part of an overall shape of the slot accommodated portion and the coil end portion is located closer to the rotor core.

9. The rotating electrical machine according to claim 8, wherein
the wire is a rectangular wire, and
the slot accommodated portion has a curved shape in a circumferential direction of the stator core as well as in the radial direction of the stator core and is placed in the slot so as to contact the teeth at a plurality of positions with an insulating material therebetween.

10. The rotating electrical machine according to claim 4, wherein
the wire is a rectangular wire, and
the slot accommodated portion has a curved shape in a circumferential direction of the stator core as well as in the radial direction of the stator core and is placed in the slot so as to contact the teeth at a plurality of positions with an insulating material therebetween.

11. The rotating electrical machine according to claim 3, wherein
the wire is a rectangular wire, and
the slot accommodated portion has a curved shape in a circumferential direction of the stator core as well as in the radial direction of the stator core and is placed in the slot so as to contact the teeth at a plurality of positions with an insulating material therebetween.

12. A rotating electrical machine, comprising:
a rotor core;
a stator core disposed so as to face the rotor core in a radial direction and including a plurality of teeth and a plurality of slots each located between adjacent ones of the teeth; and
a concentric coil formed by concentrically winding a wire, and including a slot accommodated portion placed in the slot of the stator core and a coil end portion projecting in an axial direction from the stator core, wherein:
of the concentric coil, an axial outer end of the coil end portion located on a side facing the rotor core is located closer to outside in the radial direction than an axial end of the slot accommodated portion located on the side facing the rotor core, and
the slot accommodated portion has a curved shape in the radial direction of the stator core so that an axial middle part of the slot accommodated portion is located closer to the rotor core.

13. The rotating electrical machine according to claim 12, wherein
the coil end portion has a tilted shape so that the axial outer end of the coil end portion is located closer to the outside in the radial direction than a part of the coil end portion which is located closer to the slot accommodated portion.

14. The rotating electrical machine according to claim 13, wherein
the rotor core includes a cooling medium flow path through which a cooling medium can be discharged toward the tilted coil end portion with rotation of the rotor core.

15. The rotating electrical machine according to claim 14, wherein
the slot accommodated portion and the coil end portion are tilted so as to be curved in the radial direction, and have a continuously curved shape so that an axial middle part of an overall shape of the slot accommodated portion and the coil end portion is located closer to the rotor core.

16. The rotating electrical machine according to claim 15, wherein
the wire is a rectangular wire, and
the slot accommodated portion has a curved shape in a circumferential direction of the stator core as well as in the radial direction of the stator core and is placed in the slot so as to contact the teeth at a plurality of positions with an insulating material therebetween.

17. The rotating electrical machine according to claim 12, wherein
the wire is a rectangular wire, and
the slot accommodated portion has a curved shape in a circumferential direction of the stator core as well as in the radial direction of the stator core and is placed in the slot so as to contact the teeth at a plurality of positions with an insulating material therebetween.

18. The rotating electrical machine according to claim 13, wherein
the slot accommodated portion and the coil end portion are tilted so as to be curved in the radial direction, and have a continuously curved shape so that an axial middle part of an overall shape of the slot accommodated portion and the coil end portion is located closer to the rotor core.

19. The rotating electrical machine according to claim 18, wherein the wire is a rectangular wire, and the slot accommodated portion has a curved shape in a circumferential direction of the stator core as well as in the radial direction of the stator core and is placed in the slot so as to contact the teeth at a plurality of positions with an insulating material therebetween.

20. The rotating electrical machine according to claim 14, wherein the wire is a rectangular wire, and the slot accommodated portion has a curved shape in a circumferential direction of the stator core as well as in the radial direction of the stator core and is placed in the slot so as to contact the teeth at a plurality of positions with an insulating material therebetween.

21. The rotating electrical machine according to claim 13, wherein the wire is a rectangular wire, and the slot accommodated portion has a curved shape in a circumferential direction of the stator core as well as in the radial direction of the stator core and is placed in the slot so as to contact the teeth at a plurality of positions with an insulating material therebetween.

* * * * *